US011300301B2

(12) United States Patent
Rea

(10) Patent No.: US 11,300,301 B2
(45) Date of Patent: Apr. 12, 2022

(54) MANIFOLD, A BUFFER TANK COMPRISING THE MANIFOLD, AND A METHOD FOR OPERATING A HEAT EXCHANGE SYSTEM

(71) Applicant: David Patrick Rea, Carrignavar (IE)

(72) Inventor: David Patrick Rea, Carrignavar (IE)

( * ) Notice: Subject to any disclaimer, the term of this patent is extended or adjusted under 35 U.S.C. 154(b) by 1248 days.

(21) Appl. No.: 15/752,707

(22) PCT Filed: Nov. 15, 2015

(86) PCT No.: PCT/IE2015/000019
§ 371 (c)(1),
(2) Date: Feb. 14, 2018

(87) PCT Pub. No.: WO2016/075676
PCT Pub. Date: May 19, 2016

(65) Prior Publication Data
US 2018/0216834 A1 Aug. 2, 2018

(30) Foreign Application Priority Data
Nov. 12, 2014 (IE) .................................. S2014/0287

(51) Int. Cl.
*F24D 3/10* (2006.01)
*F24D 11/02* (2006.01)
(Continued)

(52) U.S. Cl.
CPC ......... *F24D 3/1066* (2013.01); *F24D 3/1008* (2013.01); *F24D 11/0228* (2013.01);
(Continued)

(58) Field of Classification Search
CPC ....... F24D 12/02; F24D 3/1066; F24D 3/1075
See application file for complete search history.

(56) References Cited

U.S. PATENT DOCUMENTS 4,276,059 A * 6/1981 Macierewicz ........... D21D 5/26
55/434
6,092,734 A * 7/2000 Rea ......................... F24D 12/02
237/8 R
(Continued)

FOREIGN PATENT DOCUMENTS

DE 20214086 U1 11/2002
DE 4442281 C2 * 7/2003 ........... F24D 3/1091
(Continued)

OTHER PUBLICATIONS

International Search Report for PCT/IE2015/000019 by the European Patent Office, dated Jan. 25, 2016.
Written Opinion for PCT/IE2015/000019 by the European Patent Office.
Office Action issued by the European Patent Office dated Oct. 15, 2020 under Application No. EP15798573 entitled A manifold, a buffer tank comprising the manifold, and a method for operating a heat exchange system.

*Primary Examiner* — Avinash A Savani
*Assistant Examiner* — Deepak A Deean
(74) *Attorney, Agent, or Firm* — Michael Crilly, Esquire

(57) ABSTRACT

A manifold (15) comprising a flow chamber (35) for receiving flow heat exchange water from respective heat sources (3, 5, 7) through first inlet ports (47, 48) and from which the flow heat exchange water is delivered to heat exchange circuits (8, 9) through flow ports (57, 58). A return chamber (36) in the manifold (15) for receiving return heat exchange water from the heat exchange circuits (8, 9) through return ports (57, 58), and from which the return heat exchange water is returned to some of the heat sources (3, 5, 7) through first outlet ports (53, 54). A bypass chamber (37) located in the manifold (15) between the flow chamber (35) and the return chamber (36) receives flow water from the flow chamber (35), which has not been drawn off by the heat (Continued)

exchange circuits (8, 9), through a communicating passageway (40). Heat exchange water from the bypass chamber (37) is returned through second outlet ports (55, 56) to others of the heat sources (3, 5, 7).

18 Claims, 8 Drawing Sheets

(51) Int. Cl.
  *F24D 12/02* (2006.01)
  *F24D 19/08* (2006.01)
  *F24D 19/10* (2006.01)
(52) U.S. Cl.
  CPC .......... *F24D 12/02* (2013.01); *F24D 19/083* (2013.01); *F24D 19/1021* (2013.01); *F24D 2200/04* (2013.01); *F24D 2200/07* (2013.01); *F24D 2200/12* (2013.01); *Y02B 10/70* (2013.01); *Y02B 30/00* (2013.01)

(56) References Cited

U.S. PATENT DOCUMENTS

| | | | | |
|---|---|---|---|---|
| 2005/0006057 A1* | 1/2005 | Rauser | ................ | F28F 9/0202 |
| | | | | 165/83 |
| 2009/0020270 A1* | 1/2009 | Strelow | ............... | F24D 19/1024 |
| | | | | 165/104.31 |
| 2009/0205635 A1* | 8/2009 | Kwak | .................... | F24S 80/54 |
| | | | | 126/569 |
| 2010/0329651 A1* | 12/2010 | Erasmus | ................ | F24H 1/202 |
| | | | | 392/450 |
| 2011/0259322 A1 | 10/2011 | Davis et al. | | |

FOREIGN PATENT DOCUMENTS

| | | | | |
|---|---|---|---|---|
| DE | 102012203747 A1 * | 9/2013 | .......... | F24D 3/1066 |
| EP | 0592788 A1 | 4/1994 | | |
| EP | 1717520 A2 | 11/2006 | | |
| EP | 2481991 A2 | 8/2012 | | |
| GB | 2501586 A | 10/2013 | | |
| WO | 97/08498 A1 | 3/1997 | | |

* cited by examiner

MANIFOLD, A BUFFER TANK COMPRISING THE MANIFOLD, AND A METHOD FOR OPERATING A HEAT EXCHANGE SYSTEM

CROSS REFERENCE TO RELATED APPLICATIONS

This application is a national phase to PCT Application No. PCT/IE2015/000019 filed Nov. 12, 2015, which in turn claims priority to Irish Patent Application No. S2014/0287 filed Nov. 12, 2014, both applications being incorporated in their entirety herein by reference thereto.

FEDERALLY SPONSORED RESEARCH AND DEVELOPMENT

None

BACKGROUND OF THE INVENTION

1. Field of the Invention

The present invention relates to a manifold for coupling at least one heat exchange circuit to at least two heat sources for providing liquid heat transfer medium from the at least two heat sources to the at least one heat exchange circuit. The invention also relates to a heat exchange system and to a method for operating a heat exchange system. Additionally, the invention provides a buffer tank comprising the manifold.

2. Background

Manifolds for coupling one or more heat exchange circuits, including an indirect domestic hot water tank to two or more heat sources are known. Such a manifold is disclosed in PCT Patent Application Specification No. WO 97/08498. The manifold disclosed in PCT Specification No. WO 97/08498 comprises a flow chamber and a return chamber. A heated liquid heat transfer medium, such as heated heat exchange water from the heat sources, typically boilers is delivered to the flow chamber, and return heat exchange water in the manifold is returned to the boilers and other heat sources from the return chamber. Flow heat exchange water is circulated through the heat exchange circuits from the flow chamber to the return chamber. Thus, all the heat sources receive return heat exchange water from the manifold at one and the same temperature, namely, at the temperature of the heat exchange water in the return chamber. While this is adequate and indeed satisfactory for heat exchange systems which include heat sources all of which require return heat exchange water temperature to be at a similar temperature in order to operate at their most efficient, in certain cases, it is necessary to include heat sources in a heat exchange system whereby some of the heat sources require the return heat exchange water to be at a lower temperature than others. For example, in the case of a conventional gas fired or oil fired boiler, it is desirable that the temperature difference between the flow heat exchange water and the return heat exchange water should be minimized, while in the case of, for example, a condensing boiler it is desirable that the temperature difference between the flow heat exchange water and the return heat exchange water should be maximized, in order that the return water is sufficiently cold to achieve full condensing of the flue gases.

Accordingly, there is a need for a manifold for a heat exchange system which is suitable for coupling one or more heat exchange circuits to two or more boilers where at least one of the boilers requires return heat exchange water to be at a temperature different to the temperature of the return heat exchange water required by one or more of the other boilers or heat sources.

The present invention is directed towards providing such a manifold, a buffer tank comprising the manifold and heat exchange system, as well as a method for operating a heat exchange system.

SUMMARY OF THE INVENTION

According to the invention there is provided a manifold having a hollow interior region divided to form a flow chamber configured to receive liquid heat transfer medium from at least two heat sources, and to provide the heat transfer medium to at least one heat exchange circuit, a return chamber configured to receive heat transfer medium returned from the heat exchange circuit, and to provide the returned heat transfer medium to one of the at least two heat sources, and a bypass chamber communicating with the flow chamber and configured to provide heat transfer medium from the bypass chamber to another one of the at least two heat sources.

In one aspect of the invention adjacent ones of the flow, return and bypass chambers are configured to communicate with each other to substantially equalize the pressure in the heat transfer medium in the hollow interior region. Preferably, the adjacent ones of the flow, return and bypass chambers communicate with each other through at least one corresponding aperture, and advantageously, through a plurality of corresponding apertures.

In one aspect of the invention the flow chamber, the return chamber and bypass chamber are configured so that mixing of heat transfer medium in the return chamber with the heat transfer medium in the flow and the bypass chamber is minimized. Preferably, a communicating passageway communicates the flow chamber and the bypass chamber. Advantageously, the return chamber communicates with the flow and bypass chambers through a communicating opening.

Ideally, the return chamber communicates with the communicating passageway through the communicating opening.

In another aspect of the invention a first deflecting means is located adjacent the communicating opening for deflecting heat transfer medium flowing into the return chamber from the communicating passageway. Preferably, the first deflecting means is located between the return chamber and communicating passageway.

Preferably, the flow, return and bypass chambers extend parallel to each other. Advantageously, the manifold is configured so that in use the flow, return and bypass chambers extend substantially horizontally.

In another aspect of the invention the manifold is configured so that in use the flow chamber is located above the return chamber. Preferably, the manifold is configured so that in use the bypass chamber is located between the flow chamber and the return chamber.

In another aspect of the invention at least one inlet port is provided communicating with the flow chamber for receiving heat transfer medium from at least one of the heat sources. Preferably, at least two inlet ports are provided communicating with the flow chamber for receiving heat transfer medium from respective ones of the at least two heat sources. Advantageously, a plurality of inlet ports are provided to the flow chamber.

In one aspect of the invention at least one first outlet port is provided communicating with the return chamber for accommodating heat transfer medium from the return chamber to one of the at least two heat sources. Preferably, a plurality of first outlet ports are provided from the return chamber.

In another aspect of the invention, at least one second outlet port is provided communicating with the bypass chamber for accommodating heat transfer medium to one of the at least two heat sources. Preferably, a plurality of second outlet ports are provided from the bypass chamber.

In another aspect of the invention at least one flow port is provided communicating with the flow chamber for accommodating heat transfer medium from the flow chamber to the at least one heat exchange circuit. Preferably, a plurality of flow ports are provided from the flow chamber.

In another aspect of the invention at least one return port is provided communicating with the return chamber for accommodating heat transfer medium to the return chamber from the at least one heat exchange circuit. Preferably, a plurality of return ports is provided to the return chamber.

In one aspect of the invention the manifold comprises a base wall, a top wall spaced apart above the base wall, and a peripheral wall extending around the base wall and the top wall and joining the base wall and the top wall, and defining with the base wall and the top wall the hollow interior region. Preferably, at least one of the inlet ports is located in the peripheral wall.

In another aspect of the invention one of the inlet ports is connected to an inlet pipe which extends from the inlet port into the flow chamber and terminates in an outlet opening intermediate a portion of the peripheral wall in which the said inlet port is located and a portion of the peripheral wall substantially opposite the said inlet port. Preferably, the inlet pipe terminates in the outlet opening adjacent the portion of the peripheral wall which is substantially opposite the said inlet port.

Advantageously, a second deflecting means is located in the flow chamber adjacent but spaced apart from the outlet opening of the inlet pipe for directing the heat transfer medium from the inlet pipe to flow in the flow chamber in a direction from the outlet opening towards the portion of the peripheral wall adjacent the said inlet port.

In another aspect of the invention at least one of the first outlet ports is located in the peripheral wall.

In another aspect of the invention at least one of the second outlet ports is located in the peripheral wall.

In a further aspect of the invention at least one of the flow ports is located in the base wall, and communicates with the flow chamber through a flow pipe extending from the at least one of the flow ports, the flow pipe extending through the return chamber and the bypass chamber and terminating in an inlet opening adjacent the flow chamber.

Preferably, a third deflecting means is located in the flow chamber for deflecting heat transfer medium from the outlet opening of the inlet pipe from the inlet opening of one of the flow pipes.

In another aspect of the invention at least one return port is located in the base wall.

In another aspect of the invention an upper partition wall, and a lower partition wall spaced apart below the upper partition wall are located in the hollow interior region, the upper partition wall being spaced apart downwardly from the top wall, and the lower partition wall being spaced apart upwardly from the base wall, the upper and lower spaced apart partition walls extending from the peripheral wall into the hollow interior region for forming the flow chamber, the return chamber and the bypass chamber in the hollow interior region. Preferably, the flow chamber is formed between the upper partition wall and the top wall.

Advantageously, the return chamber is formed between the lower partition wall and the base wall.

Preferably, the bypass chamber is formed between the upper and lower partition walls.

In one aspect of the invention at least one inlet port of the flow chamber is located in the top wall.

In one aspect of the invention, the communicating opening is defined between the first deflecting means and the peripheral wall.

In another aspect of the invention the peripheral wall comprises a pair of spaced apart side walls extending upwardly from the base wall to the top wall, a first end wall extending upwardly from the base wall to the top wall and joining the side walls at one end of the manifold, and a second end wall spaced apart from the first end wall extending upwardly from the base wall to the top wall and joining the side walls adjacent the opposite end of the manifold.

Preferably, the upper and lower spaced apart partition walls extend from the first end wall between the side walls and terminate at respective locations spaced apart from the second end wall. Advantageously, the upper partition wall defines with the second end wall the communicating passageway. Preferably, the lower partition wall defines with the second end wall the communicating opening. Advantageously, the lower partition wall terminates towards the second end wall in the first deflecting means.

In another aspect of the invention a fourth deflecting means is located in the flow chamber for deflecting heat transfer medium flowing in the flow chamber past the inlet opening of the at least one flow pipe.

Preferably, a first one of the first outlet ports from the return chamber is located in the first end wall between the lower partition wall and the base wall.

Advantageously, a second one of the first outlet ports is located in the second end wall between the lower partition wall and the base wall.

Preferably, a first one of the second outlet ports is located in the first end wall between the upper and lower partition walls.

Advantageously, a second one of the second outlet ports is located in the second end wall between the upper and lower partition walls.

In another aspect of the invention the first deflecting means comprises a deflecting plate inclined in a generally downwardly direction from the lower partition wall.

In another aspect of the invention a de-aeration port extends from the flow chamber for accommodating air entrained in the heat transfer medium from the flow chamber and for accommodating expansion of the heat transfer medium in the manifold.

Preferably, a directing means is provided for directing air entrained in the heat transfer medium to the de-aeration port.

Advantageously, the directing means comprises a pair of directing plates converging towards the de-aeration port and defining a gap therebetween adjacent the de-aeration port for directing air bubbles into the de-aeration port. Preferably, the directing plates converge in the general direction of flow of the heat transfer medium through the flow chamber.

In another aspect of the invention the de-aeration port extends from the top wall of the manifold, and the directing means extends from the top wall into the flow chamber.

In another aspect of the invention a make-up port is located in the manifold for accommodating make-up heat transfer medium to the manifold. Preferably, the make-up port is configured to accommodate expansion of the heat transfer medium in the manifold. Advantageously, the make-up port communicates with the flow chamber.

Ideally, the make-up port communicates with the flow chamber downstream of the de-aeration port relative to the normal direction of flow of heat transfer medium through the flow chamber.

In another aspect of the invention the spacing between the make-up port and the de-aeration port lies in the range 70 mm to 150 mm.

In another aspect of the invention a sensor port is located in the flow chamber for receiving a temperature sensor. Preferably, the sensor port is located adjacent a location in the flow chamber adjacent at least one of the inlet ports.

Preferably, the inlet ports are configured for delivering the heat exchange medium into the flow chamber so that the heat transfer medium delivered into the flow chamber from the inlet ports flows through the flow chamber past the flow ports.

The invention also provides a buffer tank comprising an upper buffer portion and a manifold according to the invention located in the buffer tank.

Preferably, the manifold is located adjacent the lower end of the buffer tank.

Advantageously, an indirect heat exchange means is located in the buffer portion of the buffer tank for heating domestic hot water.

Preferably, the indirect heat exchange means comprises one of an indirect heat exchange tank and an indirect heat exchange coil.

The invention also provides a heat exchange system comprising a pair of heat sources and a heat exchange circuit, the heat exchange circuit being coupled to the respective heat sources through a manifold according to the invention.

Further, the invention provides a method for operating a heat exchange system comprising at least one heat exchange circuit, and at least two heat sources for heating liquid heat transfer medium for the at least one heat exchange circuit, the method comprising delivering the heat transfer medium from the at least two heat sources to a flow chamber of a manifold, circulating the heat transfer medium through the at least one heat exchange circuit from the flow chamber of the manifold to a return chamber of the manifold, returning the heat transfer medium from the return chamber to one of the at least two heat sources, and returning heat transfer medium from the flow chamber through a bypass chamber to another one of the at least two heat sources.

Preferably, the bypass chamber communicates with the flow chamber through a communicating passageway.

The advantages of the invention are many. A particularly important advantage of the invention is that the manifold is suitable for returning return liquid heat transfer medium to different heat sources at different return heat transfer medium temperatures in order to enable the heat sources to operate at optimum efficiency. Additionally, the manifold creates a neutral point within the hollow interior region thereof for the heat exchange system, whereby the pressures of the heat transfer medium in the heat exchange system are equalized at the neutral point. This equalizing of the pressures of the heat transfer medium in the heat exchange system at the neutral point in the manifold is achieved by virtue of the fact that the pressures of the heat transfer medium in the flow chamber, the return chamber and the bypass chamber of the manifold are equalized at the neutral point therein through the communicating apertures in the partition walls of the manifold.

BRIEF DESCRIPTION OF THE DRAWINGS

The invention will be more clearly understood from the following description of some preferred embodiments thereof, which are given by way of example only with reference to the accompanying drawings.

DETAILED DESCRIPTION OF THE PREFERRED EMBODIMENTS

Figure 1:
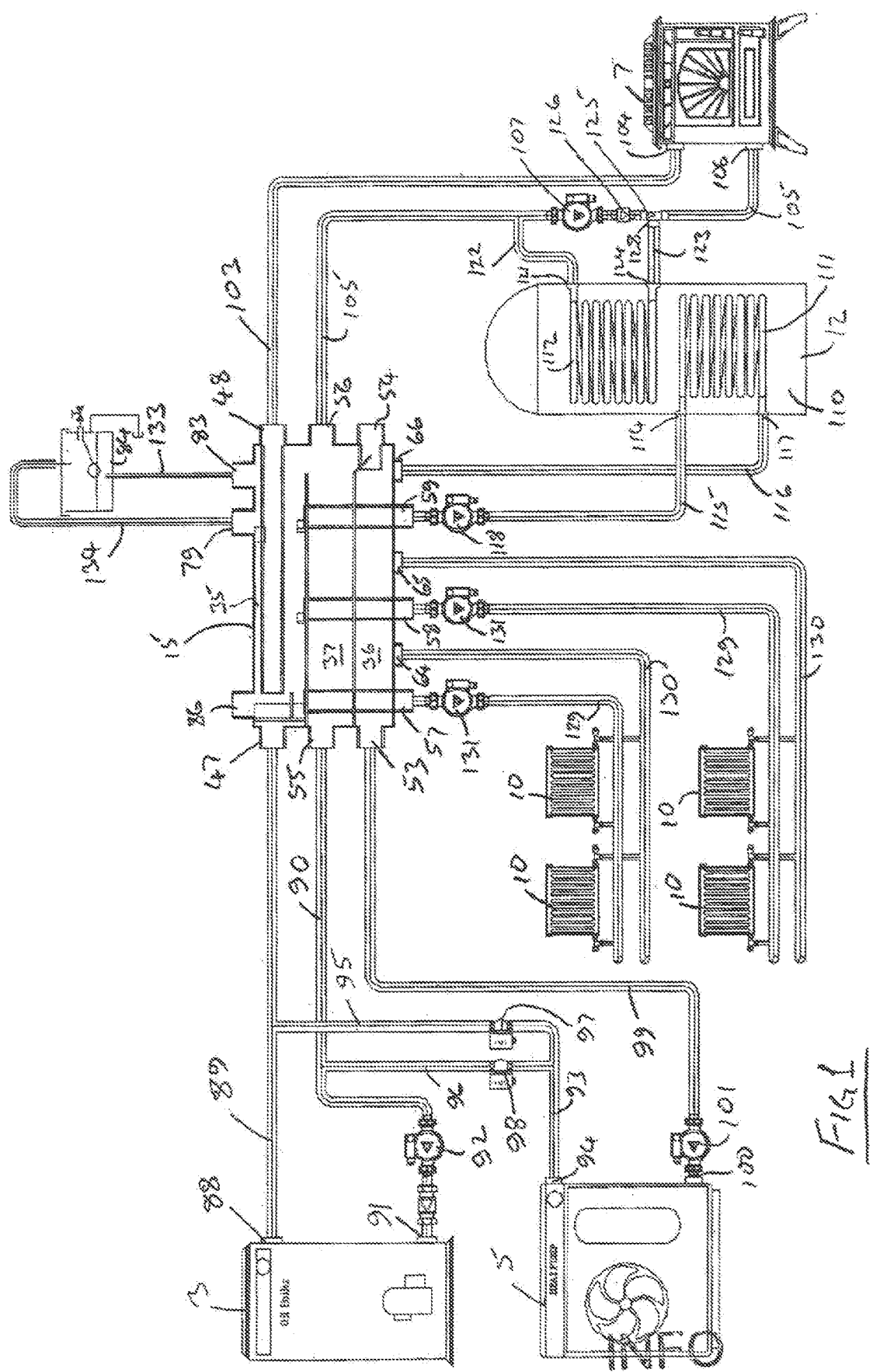
FIG. 1 is a piping circuit diagram of a heat exchange system according to the invention comprising a manifold according to the invention for coupling at least one heat exchange circuit with two heat sources.
Figure 2:
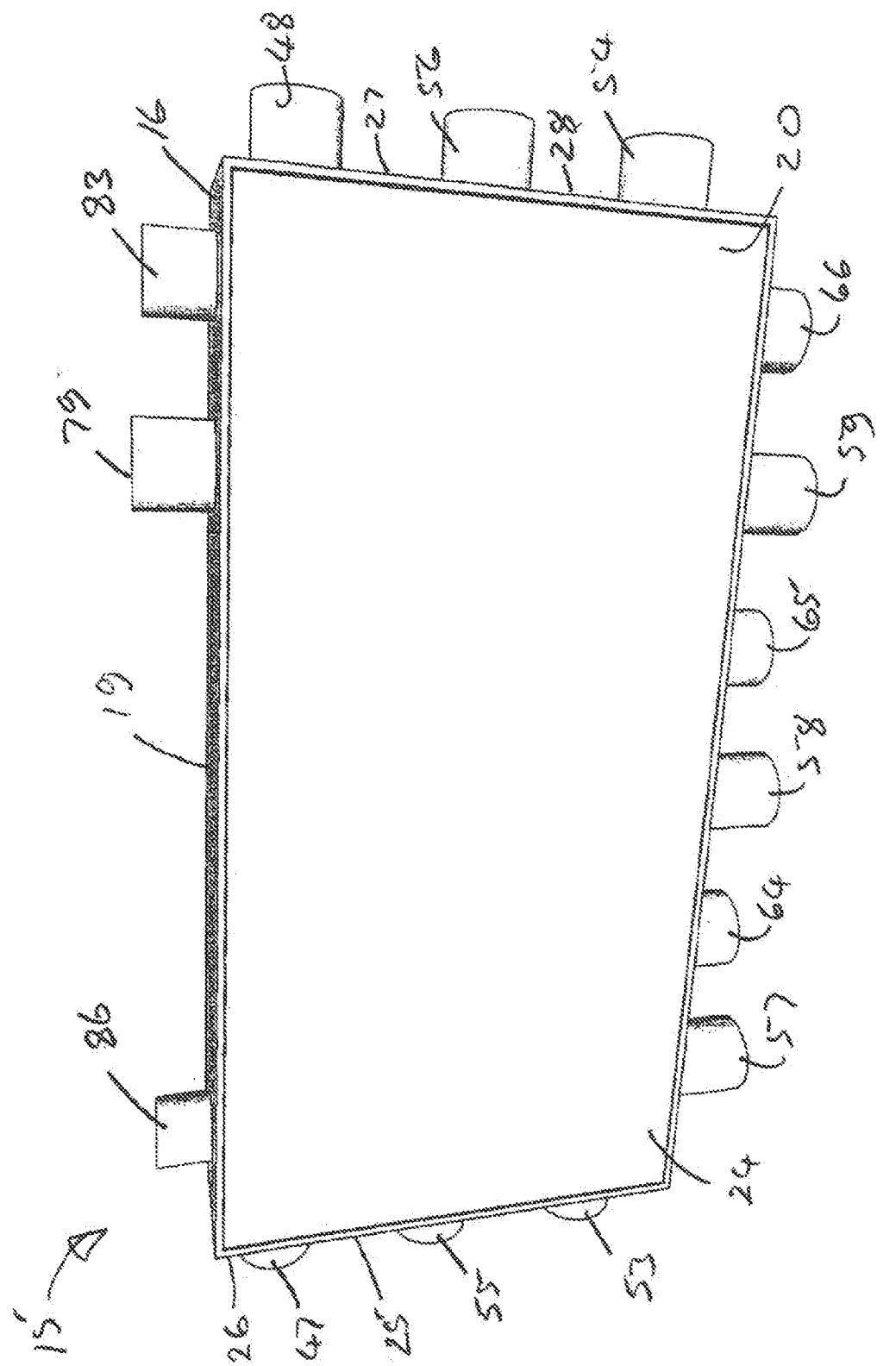
FIG. 2 is a perspective view of the manifold of FIG. 1.
Figure 3:
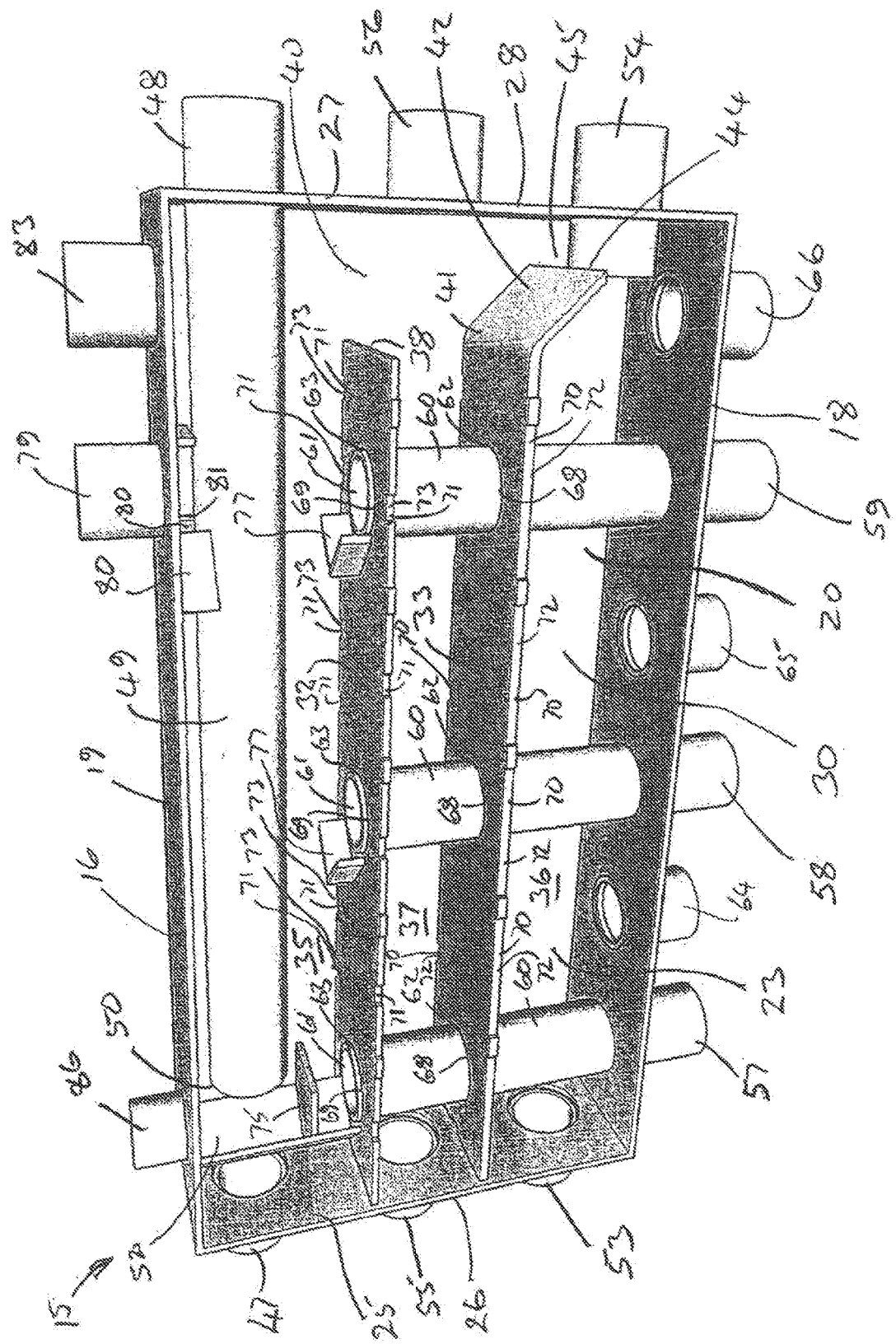
FIG. 3 is a partly cutaway perspective view of the manifold of FIG. 1.
Figure 4:
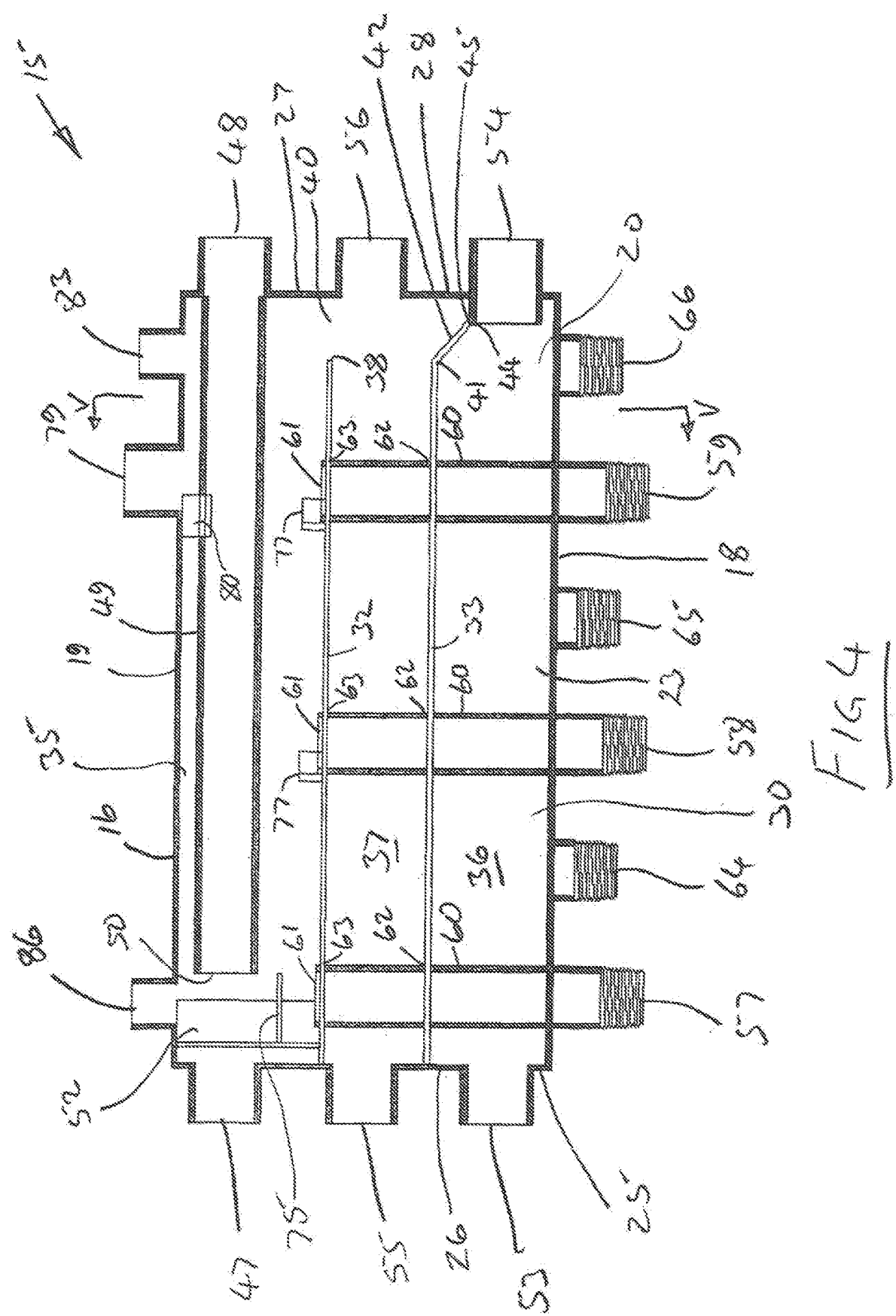
FIG. 4 is a front elevational view of the manifold of FIG. 1 with the front side plate of the manifold removed.
Figure 6:
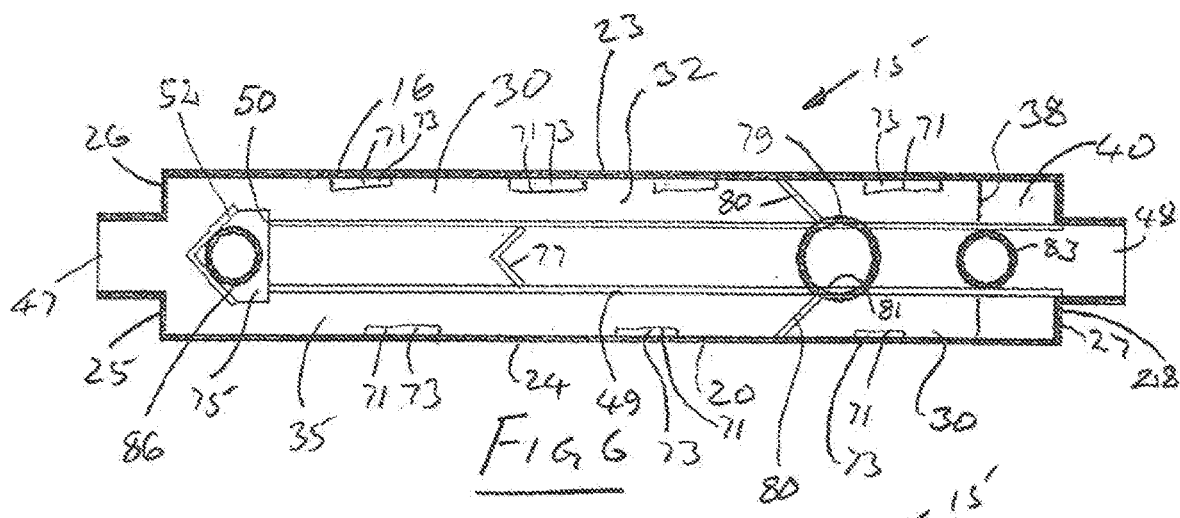
FIG. 6 is a top plan view of the manifold of FIG. 1 with a portion of the manifold removed.
Figure 7:
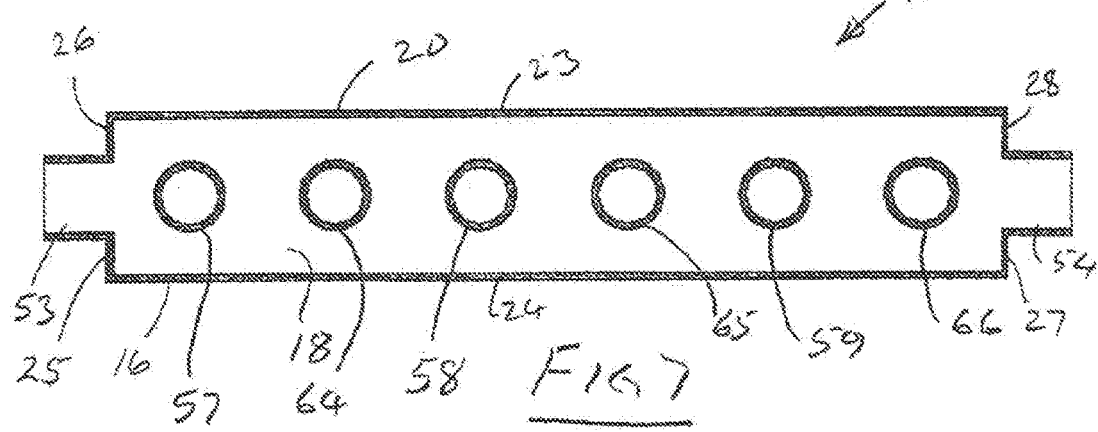
FIG. 7 is an underneath plan view of the manifold of FIG. 1 with a portion of the manifold removed.
Figure 5:
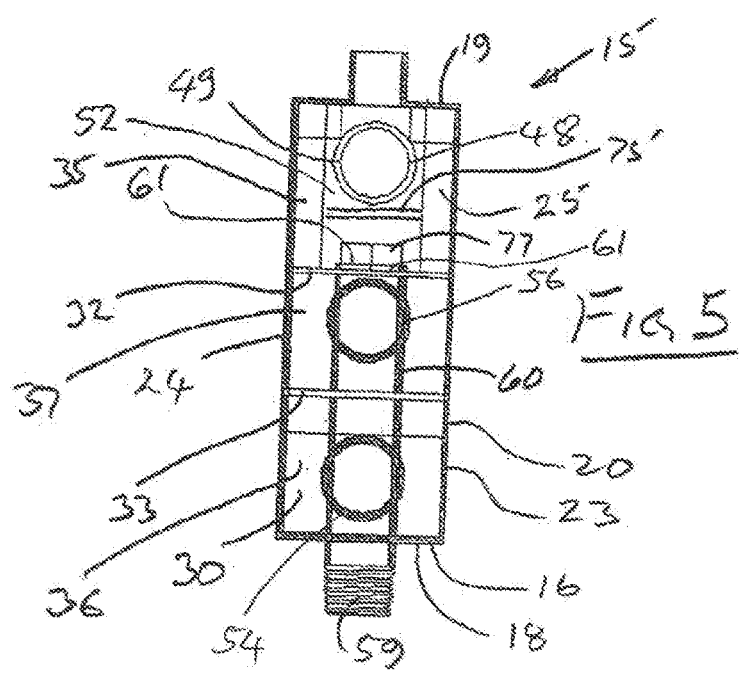
FIG. 5 is a cross-sectional end elevational view of the manifold of FIG. 1 on the line V-V of FIG. 4.

Referring to the drawings, and initially to FIGS. 1 to 8 thereof, there is illustrated a heat exchange system according to the invention, indicated generally by the reference numeral 1. The heat exchange system 1 comprises three heat sources for heating a liquid heat transfer medium, which in this embodiment of the invention is heat exchange water for the heat exchange system 1. The three heat sources in this embodiment of the invention comprise first heat source comprising a conventional boiler 3, typically an oil fired or a gas fired boiler, a second heat source, namely, a heat pump 5, and a third heat source, for example, a solid fuel boiler 7. Three heat exchange circuits, namely, first and second heat exchange circuits 8 and 9, which comprise space heating heat exchangers, namely, radiators 10, and a third heat exchange circuit, namely, an indirect domestic hot water vessel, which in this embodiment of the invention comprises an indirect hot water cylinder 12. The heat exchange circuits 8, 9 and 12 are coupled to the conventional boiler 3, the heat pump 5 and the solid fuel boiler 7 through a manifold also according to the invention and indicated generally by the reference numeral 15. Before describing the heat exchange system 1 in further detail, the manifold 15 will first be described.

The manifold 15 comprises a housing 16 which is formed by a base wall 18, a top wall 19 spaced apart above the base wall 18, and a peripheral wall 20 extending around the base wall 18 and the top wall 19 and joining the top wall 19 to the base wall 18. In this embodiment of the invention the peripheral wall 20 comprises a rear side wall 23 extending upwardly from the base wall 18 to the top wall 19 and a front side wall 24 spaced apart from the rear side wall 23 and extending upwardly from the base wall 18 to the top wall 19. A first end wall 25 extends upwardly from the base wall 18 to the top wall 19 and joins the front and rear side walls 23 and 24 adjacent a first end 26 of the manifold 15, and a second end wall 27 spaced apart from the first end wall 25 extending upwardly from the base wall 18 to the top wall 19 and joins the front and rear side walls 23 and 24 adjacent a second end 28 of the manifold 15. The base wall 18, the top wall 19, the front and rear side walls 23 and 24 and the first and second end walls 25 and 27 together define a hollow interior region 30 for heat exchange water which is heated by one or more of the conventional boiler 3, the heat pump 5 and the solid fuel boiler 7 and delivered to the first and second heat exchange circuits 8 and 9, and the indirect domestic hot water cylinder 12, as will be described below.

An upper partition wall 32 and a lower partition wall 33 which is spaced apart downwardly from the upper partition wall 32 extend into the hollow interior region 30 from the first end wall 25 between the rear and front side walls 23 and 24. The upper partition wall 32 is spaced apart downwardly from the top wall 19 and defines with the top wall 19 and the rear and front side walls 23 and 24 a flow chamber 35 in the hollow interior region 30. The lower partition wall 33 is spaced apart above the base wall 18 and defines with the base wall 18 and the rear and front side walls 23 and 24 a return chamber 36 in the hollow interior region 30. The upper partition wall 32 and the lower partition wall 33 define with the rear and front side walls 23 and 24 a bypass chamber 37.

The upper partition wall 32 terminates at a location 38 which is spaced apart from the second end wall 27 and defines with the second end wall 27 a communicating passageway 40 between the flow chamber 35 and the bypass chamber 37. The lower partition wall 33 terminates at 41 in a first deflecting means, namely, a downwardly inclined first deflecting plate 42 which is provided for a purpose to be described below. The first deflecting plate 42 terminates at 44 and defines with the second end wall 27 a communicating opening 45 through which the return chamber 36 communicates with the communicating passageway 40.

The flow chamber 35, the return chamber 36 and the bypass chamber 37 extend in the hollow interior region 30 of the manifold 15 parallel to each other. The manifold 15 is configured to be mounted so that in use the flow chamber 35, the return chamber 36 and the bypass chamber 37 extends substantially horizontally, with the flow chamber 35 located above the return chamber 36, and the bypass chamber 37 located between the flow chamber 35 and the return chamber 36.

The flow chamber 35 is configured to receive heated heat exchange water from one or more of the conventional boiler 3, the heat pump 5 and the solid fuel boiler 7 and to provide heat exchange water to the first and second heat exchange circuits 8 and 9 and the indirect domestic hot water cylinder 12. The return chamber 36 is configured to receive heat exchange water returned from the first and second heat exchange circuits 8 and 9 and the indirect domestic hot water cylinder 12, and also to return the returned heat exchange water to the ones of the conventional boiler 3, the heat pump 5 and the solid fuel boiler 7 which require the temperature difference between the flow heat exchange water from the boiler or heat pump and the return heat exchange water to the boiler or heat pump to be maximized in order to maximize the efficiency of operation of the boiler. The bypass chamber 37 is provided to return heat exchange water to the ones of the conventional boiler 3, the heat pump 5 and the solid fuel boiler 7 which require the temperature difference between the flow heat exchange water from the boiler or the heat pump and the return heat exchange water to the boiler or the heat pump to be minimized in order to maximize the efficiency of operation of the boiler or the heat pump and to protect the internal components of the boiler from flue gas condensation forming thereon. Accordingly, in cases where all the heat exchange water delivered by the conventional boiler 3, the heat pump 5 and the solid fuel boiler 7 to the manifold 15 is not all drawn from the manifold 15 by the first and second heat exchange circuits 8 and 9 and the indirect domestic hot water cylinder 12, that excess heat exchange water is returned to the relevant one or ones of the conventional boiler 3, the heat pump 5 and the solid fuel boiler 7 from the bypass chamber 37 and is drawn through the bypass chamber 37 from the flow chamber 35 through the communicating passageway 40.

A first inlet port 47 is provided in the first end wall 25 between the upper partition wall 32 and the top wall 19 for delivering heat exchange water into the flow chamber 35 from the conventional boiler 3 and the heat pump 5. A second inlet port 48 is located in the second end wall 27 between the upper partition wall 32 and the top wall 19 for accommodating heated heat exchange water from the solid fuel boiler 7 to the flow chamber 35. An inlet pipe 49 extends from the second inlet port 48 through the flow chamber 35 and terminates in an outlet opening 50 adjacent but spaced apart from the first end wall 25 for delivering the heated heat exchange water from the solid fuel boiler 7 into the flow chamber 35 towards the first end 26 of the manifold 15. A second deflecting means, namely, a V-shaped deflector plate 52 extends downwardly from the top wall 19 into the flow chamber 35 to the upper partition wall 32 adjacent but spaced apart from the outlet opening 50 of the inlet pipe 49 for directing heat exchange water from the inlet pipe 49 in a direction towards the second end wall 27, so that heat exchange water from the conventional boiler 3, the heat pump 5 and the solid fuel boiler 7 flow through the flow chamber 35 in a general direction from the first end 26 to the second end 28 of the manifold 15.

A plurality of first outlet ports, in this embodiment of the invention two first outlet ports 53 and 54 extend through the first end wall 25 and the second end wall 27, respectively, for returning heat exchange water to the appropriate ones of the conventional boiler 3, the heat pump 5 and the solid fuel boiler 7. In this embodiment of the invention heat exchange water is returned from the return chamber 36 through the first outlet port 53 to the heat pump 5 so that the temperature difference between the flow heat exchange water from the heat pump 5 and the return heat exchange water to the heat pump 5 is maximized.

Second outlet ports 55 and 56 are located in the first and second end walls 25 and 27, respectively, between the upper and lower partition walls 32 and 33 for returning heat exchange water from the bypass chamber 37. The second outlet port 55 returns heat exchange water from the bypass chamber 37 to the conventional boiler 3 so that the temperature difference between the flow heat exchange water from and the return heat exchange water to the conventional boiler 3 is minimized, in order to avoid condensation in the conventional boiler 3, and in order that the conventional boiler 3 operates at a maximum efficiency. Heat exchange water is returned from the bypass chamber 37 through the second outlet port 56 to the solid fuel boiler 7, likewise for minimizing the temperature difference between the flow heat exchange water from and the return heat exchange water to the solid fuel boiler 7.

A plurality of flow ports, in this case three flow ports 57, 58, 59 extend from the base wall 18 of the manifold 15 and communicate with the flow chamber 35 through respective flow pipes 60 which extend upwardly from the flow ports 57, 58 and 59 through corresponding openings 62 in the lower partition wall 33 and corresponding openings 63 in the upper partition wall 32. The flow pipes 60 terminate in inlet openings 61 adjacent the flow chamber 35 for accommodating heat exchange water into the flow pipes 60 from the flow chamber 35 to the corresponding flow ports 57, 58 and 59. In this embodiment of the invention flow heat exchange water is delivered to the first and second heat exchange circuits 8 and 9 through the flow ports 57 and 58, respectively, and flow heat exchange water is delivered to the indirect domestic hot water cylinder 12 as will be described in more detail below through the flow port 59.

A plurality of ports 64, 65 and 66 extend from the base wall 18 through which return heat exchange water from the first and second heat exchange circuits 8 and 9 and the indirect domestic hot water cylinder 12 is returned to the return chamber 36. Return heat exchange water from the first and second heat exchange circuits 8 and 9 is returned to the return chamber 36 through the return ports 64 and 65, while return heat exchange water from the indirect domestic hot water cylinder 12 is returned to the return chamber 36 through the return port 66.

The first deflecting plate 42 is located spaced apart above the return port 66 for deflecting return heat exchange water returned to the return chamber 36 into the return chamber 36 and away from the communicating passageway 40.

A plurality of apertures are located in the upper and lower partition walls 32 and 33 to permit sufficient flow of heat exchange water between the flow chamber 35, the return chamber 36 and the bypass chamber 37 in order to minimize the development of pressure differentials within the hollow interior region 30 of the manifold 15, and to create a neutral point in the follow interior region 30 of the manifold 15 for substantially equalizing the pressure in the heat exchange water of the heat exchange system 1. The openings 62 and 63 which extend through the lower and upper partition walls 33 and 32, respectively, are of diameter greater than the outside diameter of the flow pipes 60 in order to define annular apertures 68 and 69, respectively, which communicate the bypass chamber 37 with the return chamber 36 and with the flow chamber 35, respectively. Additionally, cutouts 70 and 71 are formed in the upper partition wall 32 and the lower partition wall 33, respectively, and define apertures 72 and 73 with the rear and front side walls 23 and 24 also for communicating the bypass chamber 37 with the flow chamber 35 and with the return chamber 36, respectively. Additionally, the bypass chamber 37 communicates with the flow chamber 35 and the return chamber 36 through the communicating passageway 40 and the communicating opening 45, respectively. Accordingly, the risk of a pressure differential developing within the hollow interior region 30 of the manifold 15 is minimized if not entirely eliminated, and thus the manifold 15 creates a neutral point for the heat exchange system 1.

A third deflecting means, in this embodiment of the invention a deflecting plate 75 extends from the V-shaped deflecting plate 52 in the flow chamber 35 in a direction towards the second end wall 27 between the inlet pipe 49 and the inlet opening 61 of the flow pipe 60 extending from the flow port 57. The deflecting plate 75 is spaced apart above the inlet opening 61 in order to deflect heat exchange water being delivered into the flow chamber 35 through the inlet pipe 49 from entering the flow pipe 60 of the flow port 57 through the inlet opening 61 in the event that heat exchange water is not being drawn from the flow chamber 35 through the flow port 57.

Fourth deflecting means, namely, V-shaped deflecting plates 77 extend upwardly from the upper partition wall 32 into the flow chamber 35 for deflecting heat exchange water flowing through the flow chamber 35 from the first end 26 to the second end 28 of the manifold from the inlet openings 61 of the flow pipes 60 of the flow ports 58 and 59 when flow heat exchange water is not being drawn through the flow ports 58 and 59. The V-shaped deflecting plate 52 in the flow chamber 35 also acts to deflect heat exchange water flowing in the flow chamber 35 from the first end 26 to the second end 28 of the manifold 15 from the inlet opening 61 of the flow pipe 60 of the flow port 57 in the event of heat exchange water not being drawn through the flow port 57.

A de-aeration port 79 extends through the top wall 19 of the manifold 15 for removing air entrained in the heat exchange water and air bubbles in the heat exchange water in the flow chamber 35. The de-aeration port 79 also acts as an expansion port from the manifold 15 for accommodating expansion of the heat exchange water. A directing means comprising a pair of directing plates 80 extend downwardly from the top wall 19 into the flow chamber 35 and converge in a direction from the first end 26 to the second end 28 of the manifold 15 and converge to define an air and a bubble accommodating gap 81 for directing air and air bubbles in the heat exchange water to the de-aeration port 79 so that the air and air bubbles can rise through the de-aeration port 79.

A make-up port 83 extends from the top wall 19 for accommodating make-up heat exchange water into the hollow interior region 30 of the manifold 15 from a suitable make-up source, for example, a header tank 84 of the heat exchange system 1. In order to minimize any pressure differential developing between the make-up port 83 and the de-aeration port 79 when the de-aeration port 79 is acting also as an expansion port, the make-up port 83 is located downstream of the de-aeration port 79 in the direction of flow of heat exchange water in the flow chamber 35, namely, in the direction from the first end 26 to the second end 28 of the manifold 15, at a spacing in the range of 70 mm to 150 mm centre to centre between the make-up port 83 and the de-aeration port 79.

A sensor port 86 extends from the top wall 19 of the manifold 15 adjacent the first end 26 where the heat exchange water is hottest. The sensor port 86 is configured to accommodate a temperature sensor into the flow chamber 35 for monitoring the temperature of the heat exchange water in the flow chamber 35 adjacent the first end 26 of the manifold 15.

Returning now to the heat exchange system 1, a flow port 88 of the conventional boiler 3 is connected to the first inlet port 47 to the flow chamber 35 of the manifold 15 by a flow pipe 89. A return pipe 90 connects the second outlet port 55 from the bypass chamber 37 to a return port 91 of the conventional boiler 3 through a pump 92 which circulates heat exchange water between the conventional boiler 3 and the manifold 15.

A flow pipe 93 extending from a flow port 94 of the heat pump 5 is connected to the flow pipe 89 and the return pipe 90 through respective connecting pipes 95 and 96 and motorized valves 97 and 98, respectively. A return pipe 99 connects the first outlet port 53 from the return chamber 36 to a return port 100 of the heat pump 5. A circulating 101 is provided in the return pipe 99. The motorized valves 97 and 98 are selectively operable in first state and a second state.

In the first state the motorized valve 97 is operated in the open state, and the motorized valve 98 is operated in the closed state. Thus, in the first state the flow port 94 of the heat pump 5 is connected directly to the first inlet port 47 of the manifold 15 through the flow pipe 93, the connecting pipe 95 and the flow pipe 89. In the first state, when the circulating pump 101 is activated heat exchange water is circulated directly between the heat pump 5 and the manifold, with the heat exchange water being delivered to the flow chamber 35 of the manifold 15 from the heat pump 5 and returned from the return chamber 36 of the manifold 15 to the heat pump 5.

In the second state of operation of the motorized valves 97 and 98, the motorized valve 97 is operated in the closed state and the motorized valve 98 is operated in the open state. Thus, in the second state the outlet port 94 of the heat pump 5 is connected to the inlet port 91 of the conventional boiler 3 through the flow pipe 93, the connecting pipe 96 and the return pipe 90. In the second state of the motorized valves 97 and 98 when the circulating pump 101 is activated the heat pump 5 acts to preheat the heat exchange water from the return chamber 36 of the manifold 15 for the conventional boiler 3. Heat exchange water from the return chamber 36 is drawn by the circulating pump 101 through the return pipe 99 and is circulated through the heat pump 5 through the return port 100 thereof. The heated heat exchange water from the heat pump 5 is delivered through the flow port 94, the flow pipe 93, the connecting pipe 96, the return pipe 90 and is drawn by the circulating pump 92 and delivered into the conventional boiler 3 through the return port 91. Heated flow heat exchange water from the conventional boiler 3 is then delivered through the flow port 88 of the conventional boiler 3 through the flow pipe 89 into the flow chamber 35 through the first inlet port 47. In this way, the coldest heat exchange water from the manifold 15, which is the heat exchange water from the return chamber 36 is preheated by the heat pump 5 prior to being drawn into the conventional boiler 3.

Before describing the connection of the solid fuel boiler 7 into the heat exchange system 1 through the manifold 15, the indirect domestic hot water cylinder 12 will first be described. The indirect domestic hot water cylinder 12 defines a hollow interior region 110 within which a pair of heat exchange coils, namely, a lower heat exchange coil 111 and an upper heat exchange 112 are located for heating domestic hot water in the hollow interior region 110. The lower heat exchange coil 111 is located below the upper heat exchange coil 112, and terminates in an inlet port 114, and a return port 117 which extend through the indirect domestic hot water cylinder 12. The upper heat exchange coil 112 terminates in an inlet port 121 and a return port 124 both of which, also extend through the indirect domestic hot water cylinder 12.

Turning now to the connection of the solid fuel boiler 7 to the manifold 15 of the heat exchange system 1, a flow port 104 of the solid fuel boiler 7 is connected to the flow chamber 35 of the manifold 15 through the second inlet port 48. A return pipe 105 connects a return port 106 to the solid fuel boiler 7 to the bypass chamber 37 of the manifold 15 through the second outlet port 56. A circulating pump 107 in the return pipe 105 circulates the heat exchange water between the solid fuel boiler 7 and the manifold 15 through a non-return valve 126 located in the return pipe 105 downstream of the circulating pump 107 and an injector T-connector 125 which is also located in the return pipe 105 and is downstream of the non-return valve 126. Additionally, a connecting flow pipe 122 connects the inlet port 121 of the upper heat exchange coil 112 of the indirect domestic hot water cylinder 12 to the flow pipe 105 upstream of the circulating pump 107. A connecting return pipe 123 connects the return port 124 of the upper heat exchange coil 112 of the indirect domestic hot water cylinder 12 to a low pressure inlet port 128 of the injector T-connector 125 in the return pipe 105.

Thus, when the circulating pump 107 is deactivated, as it would normally be when the solid fuel boiler 7 is initially fired up, flow heat exchange water is delivered form the solid fuel boiler 7 through the flow port 104, the flow pipe 103 and through the second inlet port 48 into the flow chamber 35 as a result of an induced gravity/thermos siphon between the solid fuel boiler 7 and the manifold 15. Heat exchange water is returned to the solid fuel boiler 7 under the action of the induced gravity/thermos siphon from the bypass chamber 37 of the manifold 15 through the second outlet port 56, the return pipe 105 and on reaching the connecting flow pipe 122 is diverted into the upper heat exchange coil 112 in the indirect domestic hot water cylinder 12 through the inlet port 121 and through the outlet port 124 and the connecting return pipe 123 and in turn is returned through the low pressure inlet port 128 of the T-connector 125 to the flow pipe 105 and then to the solid fuel boiler 7 through the return port 106.

When the circulating pump 107 is activated, which in general it would be when the temperature of the flow heat exchange water exiting the solid fuel boiler 7 through the flow port 104 reaches a predefined temperature of approximately 65° C., the return heat exchange water to the solid fuel boiler 7 is returned directly to the return port 106 of the solid fuel boiler 7 from the second outlet port 56 of the manifold 15 through the return pipe 105, the circulating pump 107, the non-return valve 126 and the T-connector 125. However, some of the return heat exchange water is drawn through the upper heat exchange coil 112 in the indirect domestic hot water cylinder 12 as a result of heat exchange water being drawn into T-connector 125 through the low pressure port 128.

Turning now to the lower heat exchange coil 111 in the indirect domestic hot water cylinder 12, the inlet port 114 of the lower heat exchange coil 111 is connected by a flow pipe 115 to the flow port 59 of the manifold 15. A return pipe 116 connects the return port 117 of the lower heat exchange coil 111 to the return port 66 of the manifold 15. A circulating pump 118 in the flow pipe 115 circulates heat exchange water between the manifold 15 and the lower heat exchange coil 111.

The first and second heat exchange circuits 8 and 9 comprise a plurality of respective space heating radiators 10 which are connected in parallel between respective flow and return pipes 129 and 130 of the first and second heat exchange circuits 8 and 9. Although only two radiators 10 are illustrated in each of the first and second heat exchange circuits 8 and 9, it will be readily apparent to those skilled in the art that any appropriate number of radiators 10 will be provided in the respective heat exchange circuits 8 and 9. The flow pipe 129 of each heat exchange circuit 8 and 9 is connected to a corresponding one of the flow ports 57 and 58 of the manifold 15, while the return pipes 130 of the respective heat exchange circuits 8 and 9 are connected to the corresponding one of the return ports 64 and 65. Circulating pumps 131 in the flow pipes 129 of the first and second heat exchange circuits 8 and 9 circulate the heat exchange water between the manifold 15 and the respective first and second heat exchange circuits 8 and 9.

A make-up pipe 133 from the header tank 84 is connected to the make-up port 83 of the manifold 15 for supplying make-up water to the heat exchange system 1. An expansion pipe 134 extending from the de-aeration port 79 accommodates expansion of the heat exchange water from the heat exchange system therethrough to the header tank 84. Air directed into the de-aeration port 79 is released to atmosphere through the expansion pipe 134.

Figure 8:
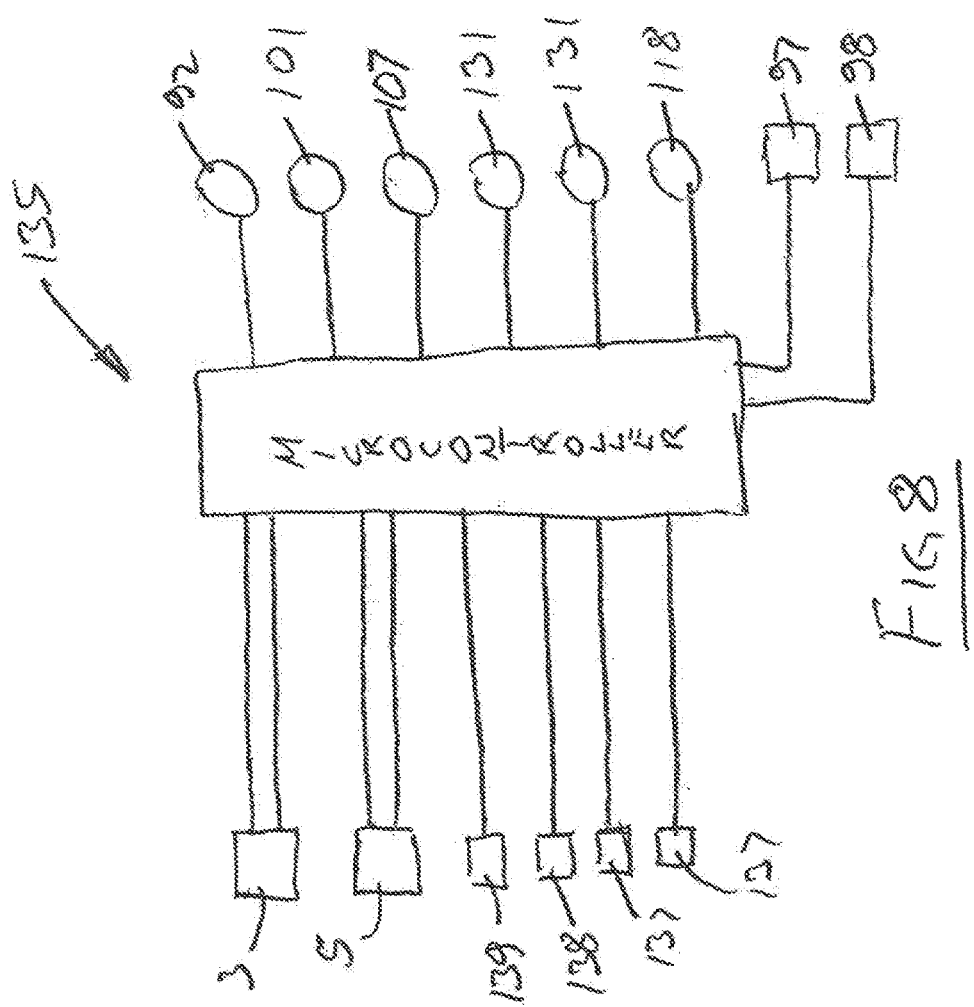
FIG. 8 is an electrical circuit diagram of a control circuit for controlling the operation of the heat exchange system of FIG. 1.

A control circuit 135 comprising a signal processor, namely, a microcontroller 136 controls the operation of the heat exchange system 1 in conjunction with controllers (not shown) of the conventional boiler 3 and the heat pump 5, see FIG. 8. Room thermostats 137 monitor air temperature in rooms heated by the radiators 10 of the first and second heat exchange circuits 8 and 9, and signals from the room thermostats 137 are read by the microcontroller 136. A cylinder thermostat 138 is located in the indirect domestic hot water cylinder 12 adjacent the top thereof monitors the temperature of the domestic hot water in the indirect domestic hot water cylinder 12 which is heated by the lower heat exchange coil 111 and the upper heat exchange coil 112. The microcontroller 136 reads signals from the cylinder thermostat 138. A pipe thermostat 139 located on the flow pipe 103 from the solid fuel boiler 7 adjacent the flow port 104 monitors the temperature of the heat exchange water being delivered from the solid fuel boiler 7. Signals from the pipe thermostat 139 are read by the microcontroller 136. The motorized valves 97 and 98 and the circulating pumps 92, 101, 107, 118 and 131 are operated under the control of the microcontroller 136 in response to temperatures read from the room thermostats 135, the cylinder thermostat 138, the pipe thermostat 139 and signals read from the controllers of the conventional boiler 3 and the heat pump 5 in order to control operation of the heat exchange system 1.

In use, with the heat exchange system 1 connected as described and illustrated in FIG. 1 and with the conventional boiler 3, the heat pump 5 and the solid fuel boiler 7 operational, when it is desired to operate the first and second heat exchange circuits 8 and 9 and to heat domestic hot water in the indirect domestic hot water cylinder 12, the control circuit 135 operates the circulating pumps 92, 101, 107, 118 and 131 in response to temperatures read from the room thermostats 137, the cylinder thermostat 138, the pipe thermostat 139 and signals read from the controllers of the conventional boiler 3 and the heat pump 5.

Flow heat exchange water from the conventional boiler 3, the heat pump 5 and the solid fuel boiler 7 is delivered into the flow chamber 35 of the manifold 15 through the first and second inlet ports 47 and 48. Flow heat exchange water is delivered from the flow chamber 35 through the flow ports 57 and 58 to the first and second heat exchange circuits 8 and 9, and through the flow port 59 to the lower heat exchange coil 111 in the indirect domestic hot water cylinder 12. Return heat exchange water from the heat exchange circuits 8 and 9 and the lower heat exchange coil 111 from the indirect domestic hot water cylinder 12 is returned to the return chamber 36 of the manifold 15 through the return ports 64, 65 and 66. Returned heat exchange water in the return chamber 36 is returned to the heat pump 5 through the first outlet ports 53, while heat exchange water which is less cold and which has bypassed the return chamber 36 from the flow chamber 35 through the communicating passageway 40 is returned from the bypass chamber 37 through the second outlet port 55 to the conventional boiler 3, through the second outlet port 56 to the solid fuel boiler 7.

The circulating path of the heat exchange water between the solid fuel boiler 7 and the manifold 15 is dependent on whether the circulating pump 107 in the return pipe 105 is activated or deactivated. Initially, on firing up of the solid fuel boiler 7 the microcontroller 136 is programmed to hold the circulating pump 107 in the deactivated state until the temperature of the flow heat exchange water from the flow port 104 of the solid fuel boiler 7 which is read by the microcontroller 136 from the pipe thermostat 139 reaches a temperature of approximately 65° C. While the circulating pump 107 is deactivated, a gravity/thermos siphon circuit is set up between the solid fuel boiler 7 and the manifold 15 whereby the flow heated heat exchange water is delivered from the solid fuel boiler 7 and the flow chamber 35 of the manifold 15 through the flow pipe 103, and return heat exchange water is returned to the solid fuel boiler 7 through the upper heat exchange coil 112 of the indirect domestic hot water cylinder 12. On the microcontroller 136 detecting the temperature of the flow heat exchange water from the solid fuel boiler 7 has reached 65° C., the microcontroller 136 activates the circulating pump 107. With the circulating pump 107 in the activated state the heat exchange water is circulated from the solid fuel boiler 7 through the flow pipe 103 to the flow chamber 35 of the manifold 15 and is returned directly to the return port 106 of the solid fuel boiler 7 from the bypass chamber 37 of the manifold 15 through the second outlet port 56 and in turn directly through the flow pipe 105. How some of the heat exchange water being returned through the return pipe 105 to the solid fuel boiler 7 is drawn through the upper heat exchange coil 112 in the indirect domestic hot water cylinder 12 as a result of heat exchange water being drawn into the T-connector 125 through the low pressure port 128 thereof.

Heat exchange water being supplied to the flow chamber 35 from the solid fuel boiler 7 is deflected and returned by the V-shaped deflecting plate 52 to flow through the flow chamber 35 in a direction from the first end 26 to the second end 28. The deflecting plate 75 deflects flow heat exchange water exiting the outlet opening 50 of the inlet pipe 49 from the inlet opening of the flow pipe 60 extending upwardly form the flow port 57 when heat exchange water is not being circulated through the first heat exchange circuit 8.

In the event that heat is not required from either of the second heat exchange circuit 9 or the lower heat exchange coil 111 in the indirect domestic hot water cylinder 12, heat exchange water flowing through the flow chamber 35 from the first end 26 to the second end 28 is deflected by the V-shaped deflecting plates 77 from the inlet openings 61 to the flow pipes 60 of the flow ports 58 and 59 from which heat exchange water is not being circulated through the corresponding heat exchange circuit 9 and the lower heat exchange coil 111 of the indirect domestic hot water cylinder 12.

As the heat exchange water flows through the flow chamber 35 from the first end 26 to the second end 28 of the manifold 15, any air bubbles and air entrained in the heat exchange water is directed by the directing plates 80 into the de-aeration port 79 where any such air or air bubbles rise up through the expansion pipe 134 and escape to atmosphere.

Heat exchange water being returned through the return port 66 from the lower heat exchange coil 111 of the indirect domestic hot water cylinder 12 is deflected by the first deflecting plate 42 away from the communicating passageway 40 into the return chamber 36.

Figure 11:
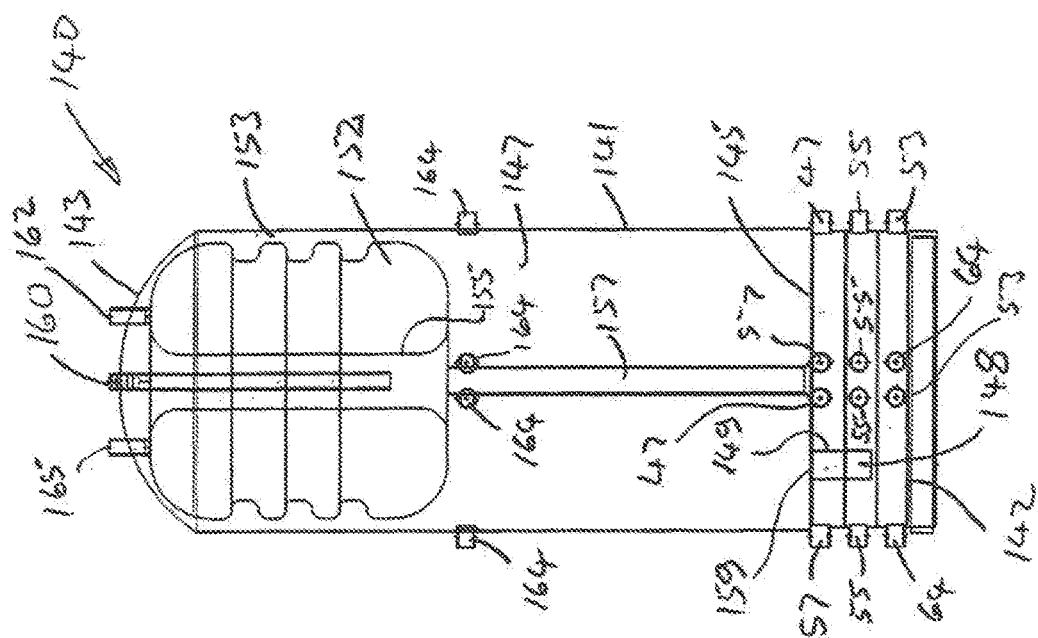
FIG. 11 is a side elevational view of the hot water buffer tank of FIG. 9.
Figure 9:
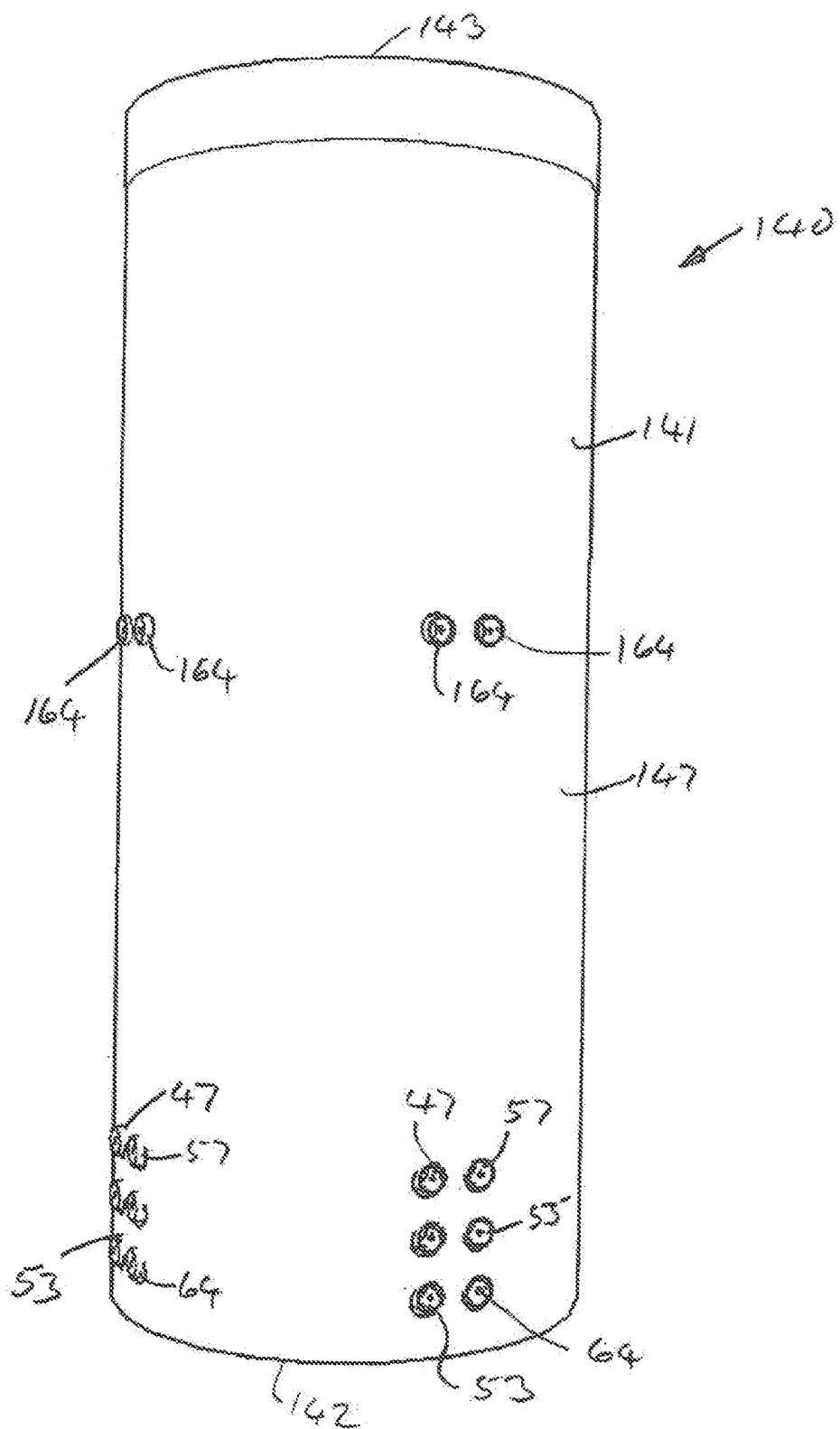
FIG. 9 is a perspective view of a hot water buffer tank also according to the invention.
Figure 10:
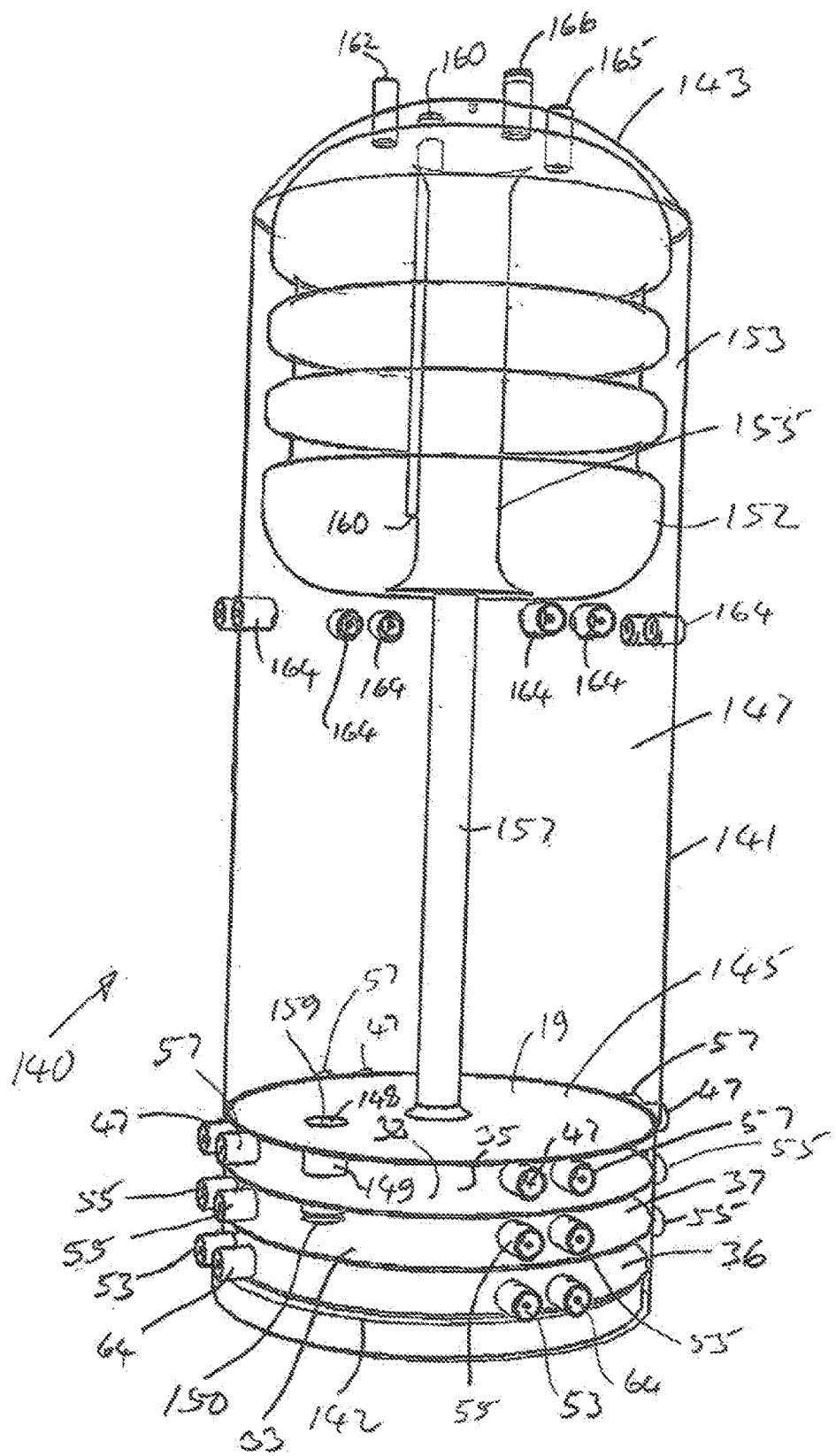
FIG. 10 is a cutaway perspective view of the hot water buffer tank of FIG. 9.

Referring now to FIGS. 9 to 11, there is illustrated a buffer tank also according to the invention, indicated generally by the reference numeral 140. The buffer tank 140 comprises a cylindrical peripheral side wall 141 extending upwardly from a base wall 142 to a substantially hemispherical top wall 143. A manifold according to another embodiment of the invention, indicated generally by the reference numeral 145, is located in the buffer tank 140 adjacent a lower end thereof. The manifold 145 is substantially similar to the manifold 15 described with reference to FIGS. 1 to 7, and similar components are identified by the same reference numerals. The main different between the manifold 145 and the manifold 15 is that the peripheral side wall of the manifold 145 is of cylindrical shape, and is formed by a lower portion of the peripheral side wall 141 of the buffer tank 140.

The base wall 142 of the buffer tank 140 forms the base wall 18 of the manifold 145. The top wall 19 of the manifold 145 forms the base of a buffer portion 147 of the buffer tank 140. Upper and lower partition walls 32 and 33 are located in the hollow interior region 30 of the manifold 145, and are of circular shape.

First inlet ports 47 are located in the peripheral side wall 141 and communicate with the flow chamber 35 of the manifold 145 in similar manner as the first inlet port 47 communicates with the flow chamber 35 of the manifold 15. However, in this embodiment of the invention there is no requirement for a second inlet port similar to the second inlet port 47 of the manifold 15, nor is there a need for an inlet pipe similar to the inlet pipe 49 of the manifold 15 to extend from such a second inlet port 48.

First outlet ports 53 are also formed in the peripheral side wall 141 and communicate with the return chamber 36 of the manifold 145 in similar manner as the first outlet ports 53 and 54 communicate with the return chamber 36 of the manifold 15. Second outlet ports 55 in the peripheral side wall 141 communicate with the bypass chamber 37 of the manifold 145 in similar manner as the second outlet ports 55 and 56 communicate with the bypass chamber 37 of the manifold 15.

Flow ports 57, in this embodiment of the invention extend through the peripheral side wall 141 and communicate with the flow chamber 35 for providing flow heat exchange water through heat exchange circuits, similar to the first and second heat exchange circuits 8 and 9, and the indirect domestic hot water cylinder 12 of the heat exchange system 1. Return ports 64 in this case extend through the peripheral side wall 141 from the return chamber 36 of the manifold 145 in similar manner as the return ports 64, 65 and 66 communicate with the return chamber 36 of the manifold 15 for accommodating return heat exchange water from the heat exchange circuits similar to the first and second heat exchange circuits 8 and 9, and the indirect domestic hot water cylinder 12 of the heat exchange system 1.

An indirect heat exchange means, namely, an indirect heat exchange tank 152 is located in the buffer tank 140 adjacent the upper end thereof in which domestic water is heated. The indirect heat exchange tank 152 is spaced apart from the top wall 143 of the buffer tank 140, and is of diameter less than the inner diameter of the peripheral wall 141 of the buffer tank 140 and defines with the peripheral side wall 141 an annular passageway 153 extending downwardly along the outer side of the indirect heat exchange tank 152. A central bore 155 extends upwardly through the indirect heat exchange tank 152 for accommodating heat exchange water to rise upwardly through the central bore 155 for heating domestic water in the indirect heat exchange tank 152. The heat exchange water on reaching the top of the bore 155 adjacent the top wall 143 of the buffer tank 140 is returned across the top of the indirect heat exchange tank 152 between the heat exchange tank 152 and the hemispherical top wall 143, and in turn downwardly through the annular passageway 153.

A central flow tube 157 extends upwardly from the top wall 19 of the manifold 145 and communicates with the flow chamber 35 for delivering heat exchange water from the flow chamber 35 upwardly into the central bore 155 of the indirect heat exchange tank 152 so that the heat exchange water from the central flow tube 157 rises through the central bore 155 and returns through the annular passageway 153 into the buffer portion 147 of the buffer tank 140.

A domestic inlet port 160 extends sealably through the peripheral side wall 141 into the indirect heat exchange tank 152 for delivering domestic hot water to be heated into the indirect heat exchange tank 152. A domestic outlet port 162 from the indirect heat exchange tank 152 extends sealably through the hemispherical top wall 143 through which heated domestic hot water is supplied. In this embodiment of the invention a secondary return port 165 extends from the indirect heat exchange tank 152 through the hemispherical top wall 143 for providing a secondary return from the indirect heat exchange tank 152. A sensor port 166 extends through the hemispherical top wall 143 into the indirect heat exchange tank 152 adjacent the top thereof for accommodating a temperature sensor for monitoring the temperature of the domestic hot water in the indirect heat exchange tank 152. In this embodiment of the invention the de-aeration port 79 is located in the hemispherical top wall 143 of the buffer tank 140, and communicates with the buffer portion 147 of the buffer tank 140.

A plurality of flow ports 164 extend from the peripheral side wall 141 of the buffer tank 140 and communicate with the buffer portion 147 of the buffer tank 140. The flow ports 164 can be coupled to heat exchange circuits, similar to the heat exchange circuits 8 and 9 as well as the heat exchange circuits being coupled at the flow ports 57. In which case, a motorized valve would be provided for switching the flow pipe of the heat exchange circuit from a corresponding one of the flow ports 164 to the corresponding one of the flow port 57, so that the flow pipe of the corresponding heat exchange circuit would be connected to the corresponding flow port 57 on the one hand or the corresponding flow port 164 on the other hand which could provide the heat exchange water of the highest temperature. In which case, temperature sensors would be provided in the flow chamber 35 and in the buffer portion 147 of the buffer tank 140 adjacent the flow ports 164.

A communicating means, in this embodiment of the invention a communicating tube 149 extends through the upper partition wall 32 for forming a communicating passageway 148 from the buffer portion 147 of the buffer tank 140 to the bypass chamber 37. A communicating opening 159 in the top wall 19 of the manifold 145 communicates the communicating passageway 148 with the buffer portion 147 of the buffer tank 140. Accordingly, heat exchange water not drawn off from the flow chamber 35 through the flow ports 57 is returned to the bypass chamber 37 from the flow chamber 35 through the central flow tube 157, the buffer portion 147 of the buffer tank 140, the communicating opening 159 and the communicating passageway 148. As well as accommodating heat exchange water from the flow chamber 35 to the bypass chamber 37, the communicating passageway 148 also acts to minimize the pressure difference between the heat exchange water in the flow chamber 35 and in the bypass chamber 37. A communicating opening 150 in the lower partition wall 33 similarly acts to minimize the pressure difference between the bypass chamber 37 and the return chamber 36, as well as in the flow chamber 35.

Otherwise, the manifold 145 and its operation is similar to the manifold 15 described with reference to FIGS. 1 to 8, and the operation of the buffer tank 140 is such that domestic hot water is heated in the indirect heat exchange tank 152 by heat exchange water from the flow chamber 35 through the central flow tube 157 and in turn through the central bore 155 extending through the indirect heat exchange tank 152.

It will be readily apparent to those skilled in the art that any number of flow ports and return ports may be provided to and from the manifolds 15 and 145, and similarly, any number of first inlet ports and first and second outlet ports may be provided to and from the manifolds 15 and 145. Needless to say, while the manifold 15 has been described as being of particular shape and the manifold 145 has been described as being of particular shape, the manifolds according to the invention may be of any suitable or desired shape.

It is also envisaged in certain cases that instead of the bypass chamber being located between the flow and return chamber, the bypass chamber could be located below the return chamber, and in which case, the return chamber would be located between the flow chamber and the bypass chamber. In which case, the communicating passageway would extend from the flow chamber to the bypass chamber past the return chamber, and the first deflecting means would deflect the heat exchange medium flowing from the flow chamber to the bypass chamber away from the return chamber.

It will also, of course, be appreciated that the flow and return ports and the first inlet port and the first and second outlet ports may be provided from any suitable wall of the manifold.

While the heat exchange system described with reference to FIG. 1 has been described as comprising two heat exchange circuits, an indirect domestic hot water cylinder, a conventional boiler, a heat pump and a solid fuel boiler, it will be readily apparent to those skilled in the art that the heat exchange system according to the invention may have any number of heat exchange circuits from one upwards, and may or may not comprise an indirect domestic hot water cylinder, and furthermore, it will be appreciated that the heat exchange system according to the invention may comprise any number of heat sources from two upwards, and the heat sources may be similar or different, and as well as comprising a conventional boiler and/or a heat pump and/or a solid fuel boiler, the heat exchange system may comprise also a condensing boiler, a solid fuel stove or the like. Needless to say, it is not essential that the heat exchange system should comprise all the boilers described, for example, the heat exchange system may comprise only two boilers, which may be the same or different.

Additionally, while it is desirable, it is not essential that the manifold should be provided with a temperature sensing port, a make-up port and a de-aeration and/or expansion port. Further, while the heat exchange system has been described as being pressurised by a header tank, in certain cases, it is envisaged that the heat exchange system may be pressurized by a pressurisation pump and a pressure vessel of the type comprising a diaphragm separating a pressured air chamber from a water chamber with the pressurized air chamber providing the necessary pressure in the water chamber for in turn pressurising the heat exchange water of the heat exchange system.

While the heat exchange circuits have been described as comprising space heating radiators, the heat exchange circuits may comprise any type of heat exchangers, and in certain cases, may be provided for underfloor heating.

It will also be appreciated that while the indirect domestic hot water cylinder has been described as being a cylinder, implying that the unit is cylindrical, it will be readily apparent to those skilled in the art that any suitable indirect domestic hot water tank may be used, irrespective of the shape and construction of the tank. For example, the indirect domestic hot water tank may be of square or rectangular cross-section in plan view or any other suitable or desired cross-section.

While the predefined temperature at which the circulating pump 107 is activated has been described as being 65° C., the circulating pump 107 could be activated at any suitable predefined temperature.

What is claimed is:

1. A manifold comprising a hollow interior region divided to form a flow chamber, a return chamber and a bypass chamber,
   the flow chamber having a first inlet port for connection to at least two heat sources,
   the flow chamber configured to receive a liquid heat transfer medium from the at least two heat sources,
   the flow chamber having at least one flow port for connection to at least one heat exchange circuit to provide the liquid heat transfer medium to the at least one heat exchange circuit,
   the return chamber having at least one return port for connection to the at least one heat exchange circuit,
   the return chamber configured to receive the liquid heat transfer medium returned from the at least one heat exchange circuit,
   the return chamber having at least one first outlet port for connection to one of the at least two heat sources to provide the liquid heat transfer medium returned from the at least one heat exchange circuit to one of the at least two heat sources,
   the bypass chamber communicating with the flow chamber,
   the bypass chamber having at least one second outlet port for connection to one of the at least two heat sources and configured to provide the liquid heat transfer medium from the bypass chamber to another one of the at least two heat sources, a communicating passageway which communicates between the flow chamber and the bypass chamber,
   the return chamber communicates with the flow chamber and with the bypass chamber through a communicating opening,
   a first deflecting means located adjacent the communicating opening for deflecting the liquid heat transfer medium flowing into the return chamber away from the communicating opening, and wherein a de-aeration port extends from the flow chamber for accommodating air entrained in the liquid heat transfer medium from the flow chamber and for accommodating expansion of the liquid heat transfer medium in the manifold, and in which a directing means is provided for directing air entrained in the liquid heat transfer medium to the de-aeration port.

2. The manifold as claimed in claim 1 wherein the first deflecting means is located between the return chamber and the communicating opening.

3. The manifold as claimed in claim 1 wherein the manifold is configured so that the bypass chamber is located between the flow chamber and the return chamber.

4. The manifold as claimed in claim 1 wherein the manifold comprises a base wall, a top wall spaced apart above the base wall, and a peripheral wall extending around the base wall and the top wall and joining the base wall and the top wall, and defining with the base wall and the top wall the hollow interior region.

5. The manifold as claimed in claim 4 wherein a second inlet port is connected to an inlet pipe which extends from the second inlet port into the flow chamber and terminates in an outlet opening intermediate a portion of the peripheral wall in which the second inlet port is located and a portion of the peripheral wall substantially opposite the second inlet port.

6. The manifold as claimed in claim 5 wherein a second deflecting means is located in the flow chamber adjacent but spaced apart from the outlet opening of the inlet pipe for directing the liquid heat transfer medium from the inlet pipe to flow in the flow chamber in a direction from the outlet opening towards the portion of the peripheral wall adjacent the second inlet port.

7. The manifold as claimed in claim 5 wherein the at least one flow port from the flow chamber is located in the base wall, and communicates with the flow chamber through a flow pipe extending from the at least one flow port, the flow pipe extending through the return chamber and the bypass chamber and terminating in an inlet opening adjacent the flow chamber.

8. The manifold as claimed in claim 7 wherein a third deflecting means is located in the flow chamber for deflecting the liquid heat transfer medium from the outlet opening of the inlet pipe from the inlet opening of the flow pipe.

9. The manifold as claimed in claim 7 wherein a fourth deflecting means is located in the flow chamber for deflecting the liquid heat transfer medium flowing in the flow chamber past the inlet opening of the flow pipe.

10. The manifold as claimed in claim 4 wherein an upper partition wall, and a lower partition wall spaced apart below the upper partition wall are located in the hollow interior region, the upper partition wall being spaced apart downwardly from the top wall, and the lower partition wall being spaced apart upwardly from the base wall, the upper and lower spaced apart partition walls extending from the peripheral wall into the hollow interior region for forming the flow chamber, the return chamber and the bypass chamber in the hollow interior region.

11. The manifold as claimed in claim 10 wherein the first deflecting means comprises a deflecting plate inclined from the lower partition wall towards the base wall.

12. The manifold as claimed in claim 1 wherein the directing means comprises a pair of directing plates converging towards the de-aeration port and defining a gap between the directing plates adjacent the de-aeration port for directing air bubbles into the de-aeration port.

13. The manifold as claimed in claim 12 wherein the directing plates converge in the general direction of flow of the liquid heat transfer medium through the flow chamber.

14. The manifold as claimed in claim 1 wherein the de-aeration port extends from a top wall of the manifold, and the directing means extends from the top wall into the flow chamber.

15. A buffer tank comprising an upper buffer portion and a manifold as claimed in claim 1 located in the buffer tank.

16. The buffer tank as claimed in claim 15 wherein the manifold is located adjacent the lower end of the buffer tank.

17. The buffer tank as claimed in claim 15 wherein an indirect heat exchange means is located in the buffer portion of the buffer tank for heating domestic hot water.

18. The buffer tank as claimed in claim 7 wherein the indirect heat exchange means comprises one of an indirect heat exchange tank and an indirect heat exchange coil.

* * * * *